July 10, 1951  G. A. KUNKEL ET AL  2,559,774
COTTON AND CORN ROLLER

Filed Dec. 22, 1947  2 Sheets-Sheet 1

Gustave A. Kunkel
Larken A. Eversole
INVENTORS

BY *Thomas A. O'Brien*
*and Harvey B. Jackson*
Attorneys

July 10, 1951  G. A. KUNKEL ET AL  2,559,774
COTTON AND CORN ROLLER

Filed Dec. 22, 1947  2 Sheets—Sheet 2

Gustave A. Kunkel
Larken A. Eversole
INVENTORS

Patented July 10, 1951

2,559,774

UNITED STATES PATENT OFFICE 2,559,774

COTTON AND CORN ROLLER

Gustave A. Kunkel and Larken A. Eversole,
Needville, Tex.

Application December 22, 1947, Serial No. 793,090

3 Claims. (Cl. 55—46)

This invention appertains to novel and useful improvements in devices adapted to be used primarily on farms and the like.

An object of this invention is to roll or otherwise perform agricultural operations on land.

Another object of this invention is to readily attach and detach supplemental rollers for use in conjunction with relatively permanent rollers.

Another purpose of this invention is to selectively position the supplemental rollers relative to the permanently mounted rollers.

Another purpose of this invention is to resiliently support the supplemental rollers thereby insuring firm contact with the ground if the end or relatively permanent rollers are raised slightly due to the engagement with a protuberance in the ground.

Another purpose of this invention is to provide an extremely simple device of the character described which is preferably of inexpensive construction utilizing welded joints and conventional rod and tubing construction.

Ancillary objects and features of novelty will become apparent to those skilled in the art, in following the description of the preferred form of the invention, illustrated in the accompanying drawings, wherein.

Figure 1:
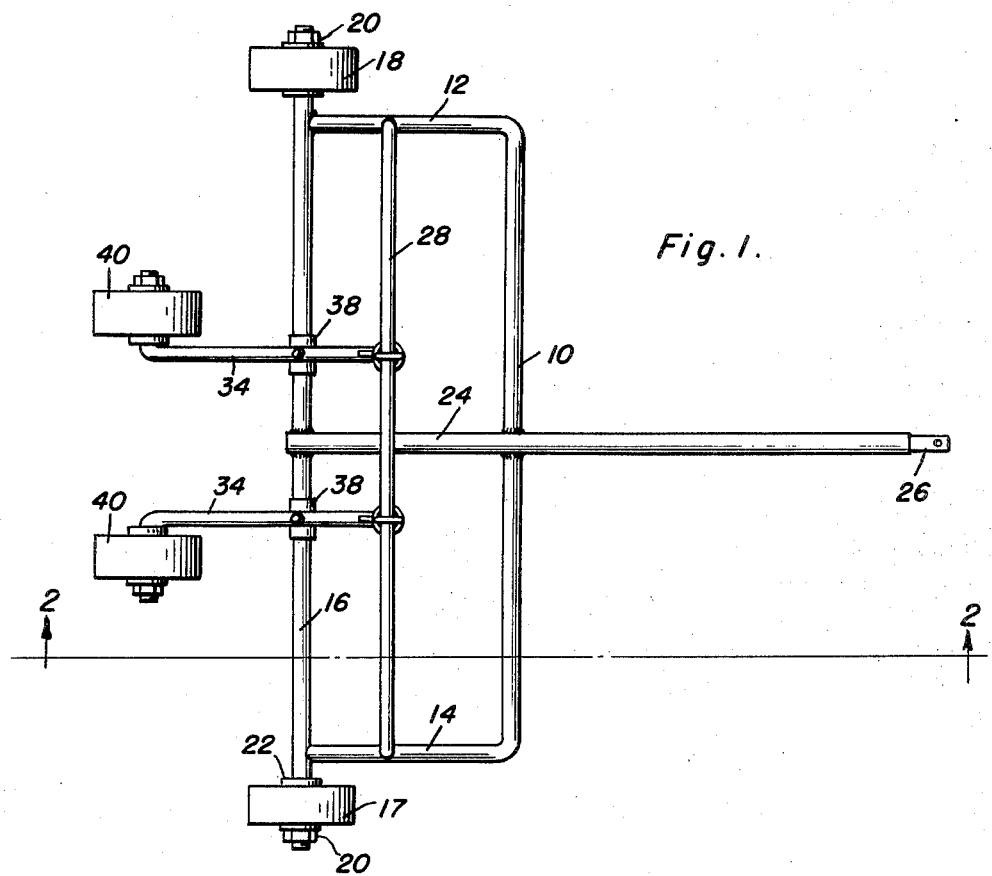
Figure 1 is a plan view of the present invention.
Figure 2:
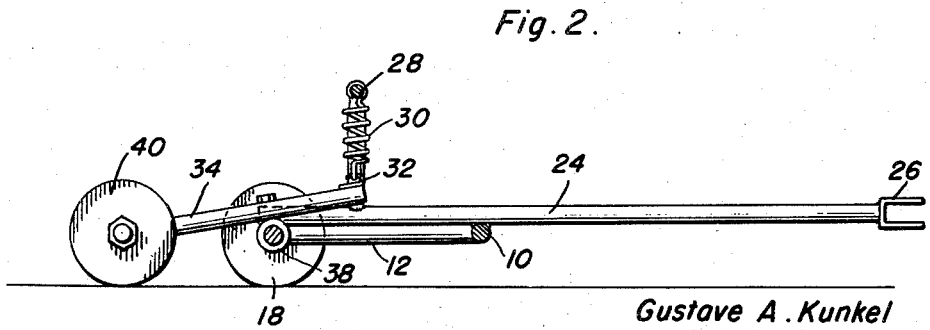
Figure 2 is a sectional view taken substantially on the line 2—2 of Figure 1 and in the direction of the arrows.
Figure 3:
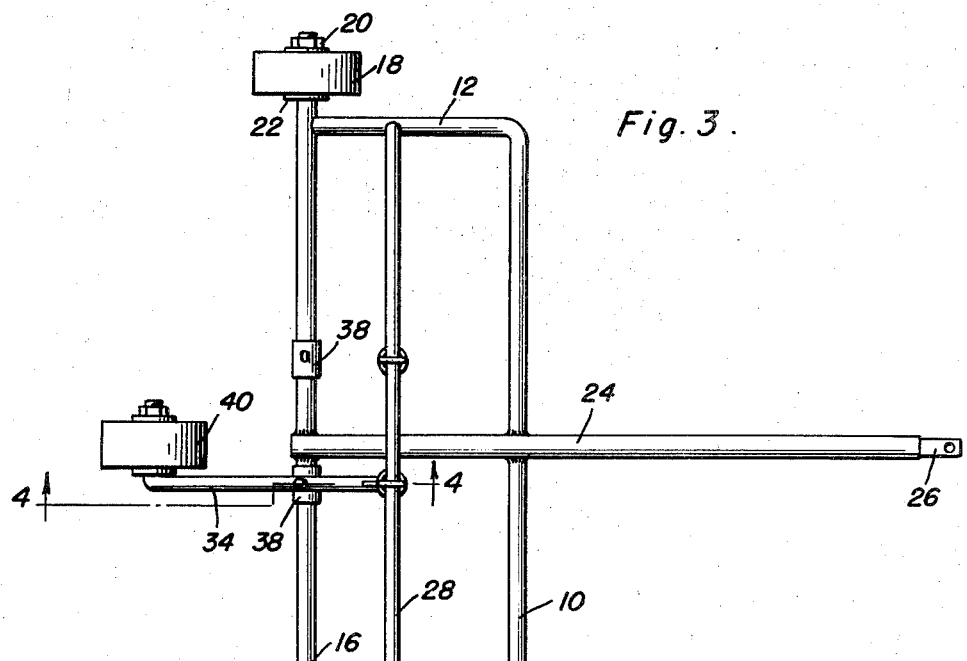
Figure 3 is a plan view of the invention illustrated in Figure 1, one supplemental roller being removed.
Figure 4:
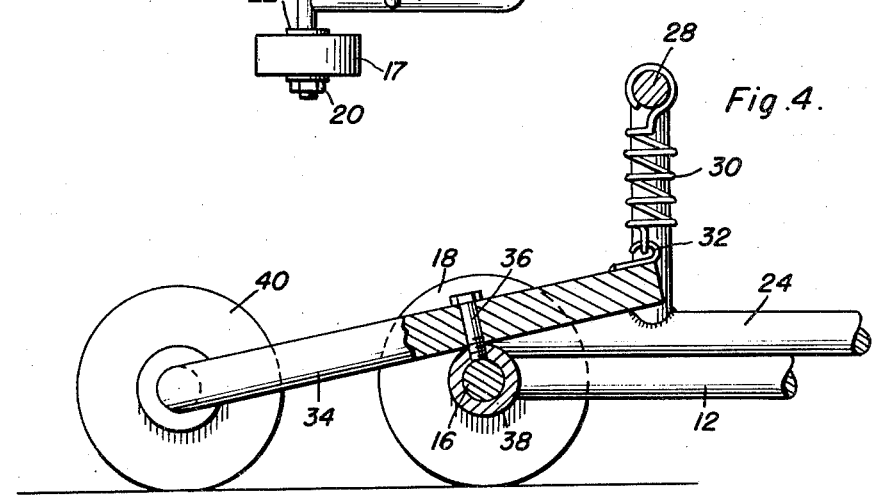
Figure 4 is a sectional view taken substantially on the line 4—4 of Figure 3 and in the direction of the arrows.

This invention has been developed to provide a device for cultivating land and particularly that whereon corn, cotton, and other similarly cultivated flora is growing.

The preferred form of the invention is so arranged that any practical number of supplemental rollers may be utilized in association therewith, thereby compensating for varying widths of rows of flora in order that a complete operation may be performed in one cycle.

A yoke 10 is provided which consists of legs 12 and 14 respectively extending at substantially right angles from the web or connecting member. An axle 16 is rigidly secured to the free ends of the legs 12 and 14 of the said yoke by any suitable means such as welding, brazing or the like. A pair of rollers 17 and 18 respectively is then placed rotatably on the said axle 16. Any suitable construction may be utilized in association with this connection such as castle nuts 20 positioned on the terminals or the said shaft 16 and thrust bearings 22 facing the opposite surfaces of the said rollers. These rollers 17 and 18 are to be used efficaciously for performing various cultivating operations on land.

A drawbar 24 is rigidly secured to the said axle 16 and to the web of the yoke 10 through the medium of welding, brazing or the like. The terminal of the said drawbar may be reduced as illustrated at 26 for the purpose of receiving any suitable source of power such as the harness of horses or the conventional appurtenances on tractors. The said reduced portions or bifurcations 26 may be modified to suit the conditions of the operator of the invention.

A substantially U-shaped bracket 28 is secured to the said legs 12 and 14, extending over the said drawbar 24. Seated and secured to this bracket 28 is a plurality of resilient members or springs 30. Any practical number of springs may be supplied in association with the bracket 28 and each spring is detachably associated with a hook 32 which is in turn rigidly secured to an arm 34.

The said arm 34 is supplied with an aperture (unnumbered) for the purpose of receiving a conventional bolt 36 therethrough. The terminal portion or threaded end of the said bolt is detachably received in a bearing 38 which is journaled on the said axle 16. Any practical number of these bearings 38 may be supplied on the said axle 16, as dictated by the demands and number of supplemental rollers that are to be used in association with the invention.

The end of the said arm 34 is bent at substantially right angles to the longitudinal axis of the said arm and receives a supplemental roller 40 thereon. Any suitable means may be used for attaching the said roller 40 to the bent end of said arm 34, such as that means illustrated in conjunction with the rollers 17 and 18.

By the above described structure it will be readily apparent that the supplemental roller 40 is detachably associated with the bracket 28 and axle 16, while the bearing 38 is used as a pivotal connection. If one end of the frame or yoke 10 is raised due to the occurrence of a protuberance in a field, the resilient tension springs 30 will maintain the roller 40 against the ground in order that it may continue to perform its intended operation.

While there has been described and illustrated but a preferred form of the invention, it is apparent that variations may be made without departing from the spirit of the invention. Accordingly, limitation is sought only in accordance with the scope of the following claims.

Having described the invention, what is claimed as new is:

1. A farm implement comprising a frame including a yoke having an axle rigidly attached to the free ends thereof, rollers attached adjacent the ends of the axle and exterior of the ends of the yoke, an arm having a roller at one end thereof, means for detachably securing said arm intermediate its ends to said axle including a bearing rotatively disposed on said axle, a fastening element detachably securing said arm to said bearing, a bracket attached to the yoke, and resilient means attaching said arm to said bracket to yieldingly oppose rotation of said arm about said axle as an axis.

2. A farm implement comprising a frame including a substantially U-shaped yoke which consists of legs and a web, an axle rigidly attached to the free ends of said legs, rollers attached adjacent the ends of the axle and exterior of the legs of the yoke, an arm having a roller at one end thereof, means for detachably securing said arm to said axle including a bearing mounted for rotation on said axle, means detachably securing said arm to said bearing for movement therewith, a substantially U-shaped bracket attached to the legs of said yoke, and a spring secured at one end to the end of said arm opposite said roller and to said U-shaped bracket.

3. A farm implement comprising a frame including a yoke having an axle rigidly attached to the free ends thereof, rollers attached adjacent the ends of the axle and exterior of the ends of the yoke, an arm having a roller thereon, means for detachably securing said arm to said axle, said means including a bearing rotatively disposed on said axle, means for detachably securing said arm intermediate its ends to said bearing for movement with said bearing, a bracket attached to the yoke, a spring attaching said arm to said bracket, and a drawbar attached to said axle and to said yoke extending beneath said bracket.

GUSTAVE A. KUNKEL.
LARKEN A. EVERSOLE.

REFERENCES CITED

The following references are of record in the file of this patent:

UNITED STATES PATENTS

| Number | Name | Date |
| --- | --- | --- |
| 186,407 | Baker | Jan. 23, 1877 |
| 810,453 | Wolf | Jan. 23, 1906 |
| 1,950,851 | Konrad | Mar. 13, 1934 |